(12) United States Patent
Hayashi et al.

(10) Patent No.: US 6,365,248 B1
(45) Date of Patent: Apr. 2, 2002

(54) EASILY TEARABLE LAMINATED BARRIER FILM AND BAG PRODUCT USING THE SAME

(75) Inventors: Takeo Hayashi; Masao Takashige, both of Sodegaura (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/508,732
(22) PCT Filed: Jul. 15, 1999
(86) PCT No.: PCT/JP99/03809
§ 371 Date: Mar. 14, 2000
§ 102(e) Date: Mar. 14, 2000
(87) PCT Pub. No.: WO00/03871
PCT Pub. Date: Jan. 27, 2000

(30) Foreign Application Priority Data

Jul. 15, 1998 (JP) ............................................ 10-200512

(51) Int. Cl.$^7$ ................................................ B32B 1/08
(52) U.S. Cl. .................. 428/35.7; 428/36.7; 428/474.4; 428/475.5; 428/475.8; 428/476.1; 428/516
(58) Field of Search ............................... 428/474.4, 516, 428/475.5, 475.8, 476.1, 35.7, 36.7

(56) References Cited

U.S. PATENT DOCUMENTS

| | | | | |
|---|---|---|---|---|
| 4,911,979 A | * | 3/1990 | Nishimoto | .................... 428/332 |
| 5,482,770 A | * | 1/1996 | Bekele | ......................... 428/339 |
| 5,914,164 A | * | 6/1999 | Ciocca et al. | ............... 428/36.7 |

* cited by examiner

Primary Examiner—Leszek Kiliman
(74) Attorney, Agent, or Firm—Flynn, Thiel, Boutell & Tanis, P.C.

(57) ABSTRACT

A laminated barrier film which is harmless to the environment and combines the property of being easily tearable with moderate barrier properties. The laminated film comprises: an easily tearable barrier film (19) which is made up of a first layer (23) to a third layer (25), has undergone stretching in a stretch ratio of 2.8 or higher in each of the machine and transverse directions, and has undergone thermal fixing by heat treatment at 120 to 195° C. so that it has a shrinkage of 15 to 40% through 20-minutes immersion in pressurized 120° C. water; and a sealant film (21) laminated to the film (19). The first layer (23) and the third layer (25) each contains 60 to 85 parts by weight of Ny6, 15 to 40 parts by weight of MXD6, and 0.1 to 10 parts by weight of a modifier, while the second layer (24) contains 0 to 40 parts by weight of a thermoplastic resin such as Ny6, 60 to 95 parts by weight of MXD6, and 0.1 to 10 parts by weight of a modifier.

6 Claims, 4 Drawing Sheets

EASILY TEARABLE LAMINATED BARRIER FILM AND BAG PRODUCT USING THE SAME

TECHNICAL FIELD

The present invention relates to easily tearable laminated barrier film capable of being split easily and bag products using the film, which can be used, for instance, as wrapping bag of food, medicine, industrial products etc.

BACKGROUND ART

Conventionally, polyvinylidene chloride (PVDC) has been generally used as wrapping material of ham and sausage.

However, polyvinylidene chloride has a problem of generating chloride gas when being burnt. On account of recently growing concern over environmental problems, other wrapping material not causing environmental pollution is requested in the field where such chloride resin has been used.

In addition, when conventional wrapping material is made into a bag, high-frequency sealer capable of high-temperature sealing is required.

Further, the wrapping material using conventional wrapping material cannot be easily torn by hand in opening the bag.

Furthermore, as a casing of sausage, top and bottom sides thereof are generally tacked by a metal band such as aluminum. However, since the casing includes the metal band, a metal locator cannot detect foreign body.

Accordingly, an object of the present invention is to provide an easily tearable laminated barrier film which is harmless to the environment and has an easy-tearability and appropriate barrier property, and bag products using the film.

DISCLOSURE OF THE INVENTION

Easily tearable laminated barrier film according to first aspect of the present invention includes: an easily tearable barrier film including first, second and third layers, the easily tearable barrier film having orientation ratio of not less than 2.8 in both machine direction (drawing direction of the film) and transverse direction (width direction of the film) during orientation and shrinkage factor of 15 to 40% in pressurized 120° C. hot water for twenty minutes by heat stabilization at 120 to 195° C. heat treatment temperature; and at least one base film laminated on the easily tearable barrier film. The easily tearable laminated barrier film is characterized in that respective layers of the easily tearable barrier film being constituted so that the first and the third layer contain 60 to 85 wt % of nylon6 (Ny6), 15 to 40 wt % of metaxylylene adipamide (MXD6), and 0.1 to 10 wt % of modifier (respective compositions totaling 100 wt %) and so that the second layer contains 0 to 40 wt % of thermoplastic resin, 60 to 95 wt % of MXD6, and 0.1 to 10 wt % of modifier (respective compositions totaling 100 wt %), the modifier being at least one selected from polyamide elastomer (PAE) and modified EVA, the modified EVA being an acid denatured body of partial saponification material of ethylene-vinyl acetate copolymer having 20 to 50 wt % of vinyl acetate.

When the first and the third layer have less than 15 wt. % of MXD6, easy tearability does not come out. On the other hand, when MXD6 exceeds 40 wt %, impact strength is greatly reduced, thus deteriorating practicability. Preferably, the content of MXD6 is 20 to 40 wt. %.

General polyolefin, polyester, polyamide etc. can be used as the thermoplastic resin of the second layer. Polyamide is most preferably used among them, and, especially, nylon6 (Ny6) is most suitably used therefor.

When MXD6 is less than 60 wt % in the second layer, barrier property is deteriorated. On the other hand, when exceeding 95 wt %, shrinkage factor can get worse. 70 to 85 wt % of MXD6 is preferably contained therein.

When the content of modifier is less than 0.1 wt % in the first to the third layer, pinholes are likely to be generated. On the other hand, when the content of the modifier exceeds 10 wt %, optical property of the film can be deteriorated to reduce value of the product.

The easily tearable film can be manufactured by melting and kneading material including predetermined amount of Ny6, MXD6 and modifier, extruding the material from a die in a film shape, cooling the film, and orienting the formed raw film at a ratio more than 2.8 in both machine direction and transverse direction.

When the orientation ratio is less than 2.8, easy tearability and linear cut property are deteriorated. Further, impact strength can be reduced, thus causing problems in actual use. Preferably, the orientation ratio is more than or the same as 3.0.

The orientation process is preferably conducted by simultaneous biaxial orientation according to tubular method.

When the heat treatment temperature is less than 120° C., shrinkage properties can be too great, thus causing wrinkles or the like on account of moisture absorption during storage and transportation to be unstabilized.

When the heat treatment temperature exceeds 195° C., crystallization of the film is too advanced, thus lowering its shrinkage rate at a target temperature. Further, a wrapping material after being filled cannot be sufficiently shrunk, thus deteriorating its appearance.

When the shrinkage rate in 120° C. pressurized hot water is less than 15%, shrinkage rate as the wrapping material is insufficient and adhesion with the contents is deteriorated. When the shrinkage rate exceeds 40%, since the shrinkage rate is too great and wrapping form is collapsed, appearance of the products can be deteriorated. The condition of 120° C. hot water for twenty minutes is in compliance with a condition for heat pasteurizing (retorting) sausages etc. after being filled in the bag.

The modified EVA can be manufactured as follows.

Material EVA may be manufactured according to any known manufacturing method such as high-pressure process and emulsification process. Normally, EVA containing 20 to 50 wt % of vinyl acetate is used, and EVA containing 30 to 45 wt % of vinyl acetate is preferably used.

Subsequently, the EVA is treated by a known saponification method, such as treating the EVA with a system including low boiling-point alcohol (such as methanol and ethanol) and alkali (such as sodium hydroxide, potassium hydroxide and sodium methylate) for obtaining partial saponification material of EVA having 50 to 95 mole percent saponification degree.

Next, the partial saponification material is processed using graft reaction and esterification reaction to obtain acid denatured body of EVA partial saponification material. The acid denaturation is mainly for applying affinity to polyamide.

An easily tearable laminated barrier film according to second aspect of the present invention is characterized in, in the first aspect of the present invention, that the thermoplastic resin of the second layer contains 5 to 40 wt % of nylon6 (Ny6).

When content of Ny6 as the thermoplastic resin of the second layer is less than 5 wt %, anti-pinhole property and shrinkage rate increase becomes insufficient. On the other hand, when the content of Ny6 exceeds 40 wt %, gas barrier property can be deteriorated.

Ny6 is contained in the resin of the second layer as well as MXD6 and modifier for improving anti-pinhole property and shrinkage rate.

Ny6 as the thermoplastic resin of the second layer is preferably 10 to 30 wt %, more preferably 20 to 30 wt %.

An easily tearable laminated barrier film according to third aspect of the present invention is characterized in, in the first or the second aspect of the present invention, that layer ratio between the first or the third layer and the second layer is from 1:8 to 2:1. In this case, layer ratio of the first, the second, and the third layer is preferably from 1:8:1 to 4:2:4.

When the ratio of the respective layers is out of the above range, easy tearability, anti-pinhole property, gas barrier property and optical property can be deteriorated.

An easily tearable laminated barrier film according to fourth aspect of the present invention is characterized in, in any one of the first to third aspect of the present invention, that the base film is a sealant film.

As a material of the sealant film, L-LDPE (linear low-density polyethylene), LDPE (low-density polyethylene), HDPE (high-density polyethylene), CPP (cast polypropylene), EVA (ethylene-vinyl acetate copolymer), PB (polybutene-1), ionomer, PMMA (polymethyl methacrylate), EMAA (ethylene-co-methacrylic acid copolymer), EAA (ethylene-acrylic acid copolymer), EMMA (ethylene-methacrylate methyl copolymer) and compounds thereof can be suitably used.

When the base film laminated on one side of the easily tearable barrier film is a sealant film, material of the other base film laminated on the other side can be determined at will.

The material of the other base film may be biaxially oriented and mono-axially oriented film or cast film such as PET (polyethylene terephthalate), EVOH (ethylene-vinylalcohol copolymer), PVA (polyvinyl alcohol), PP (polypropylene), Ny (nylon), HDPE (high-density polyethylene), PS (polystyrene) as well as material of the sealant film.

Incidentally, necessary additive may be contained in the laminated film of the present invention.

For such additive, anti-blocking agent (such as inorganic filler), water-repellant (such as ethylene bis-stearate), lubricant (such as calcium stearate) may preferably be used.

The laminated films may be laminated by, for instance, extrusion laminate, hot melt laminate, dry laminate, and wet laminate methods.

A bag product according to fifth aspect of the present invention is manufactured with use of the easily tearable laminated barrier film according to any one of the first to fourth aspects of the present invention.

On account of shrinkage property thereof, the bag product can be suitably used for wrapping foods such as ham, sausage and daily dish.

BEST MODE FOR CARRYING OUT THE INVENTION

First Embodiment

Easily tearable laminated barrier film 22 according to the present embodiment will be described below with reference to attached drawings.

Figure 1:
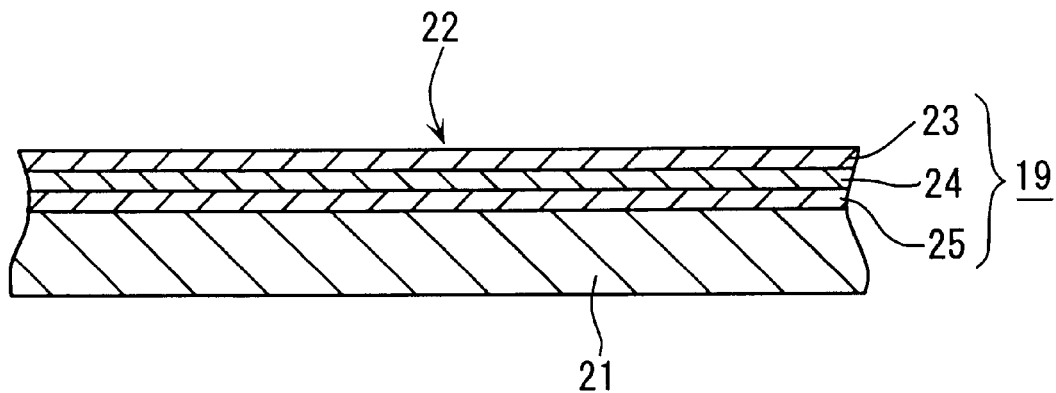
FIG. 1 is a cross-section showing structure of easily tearable laminated barrier film according to first embodiment of the present invention.

As shown in FIG. 1, the easily tearable laminated barrier film 22 according to the present embodiment has an easily tearable barrier film 19 and a sealant film 21 laminated onto one side of the easily tearable barrier film 19.

The easily tearable barrier film 19 is composed of first layer 23 to third layer 25, the easily tearable barrier film having orientation ratio of not less than 2.8 in both MD (machine direction) and TD (transverse direction) in being oriented, and shrinkage factor of 15 to 40% in pressurized hot water of 120° C. for twenty minutes by beat stabilization.

[1] Composition of respective layer and [2] layer ratio of respective layer of the easily tearable barrier film 19 are as follows.

[1] Composition: The first layer 23 and the third layer 25 includes 60 to 85 wt % of Ny6, 15 to 40 wt % of MXD6 and 0.1 to 10 wt % of modifier. The second layer 24 includes 60 to 90 wt % of MXD6, 5 to 40 wt % of Ny6 and 0.1 to 10 wt % of modifier. The modifier is at least one selected from PAE and modified EVA. The modified EVA is an acid denatured body of partial saponification material of ethylene-vinyl acetate copolymer having 20 to 50 wt % of vinyl acetate.

[2] Layer ratio: layer ratio of the first layer 23 to the third layer 25 is defined between 1:8:1 to 4:2:4 and layer ratio of the first layer 23 or the third layer 25 and the second layer 24 is defined from 1:8 to 2:1.

The sealant film 21 is made of CPP, L-LDPE, LDPE, HDPE, EVA etc.

The bag products according to the present embodiment are made using the easily tearable laminated barrier film 22.

Second Embodiment

Figure 2:
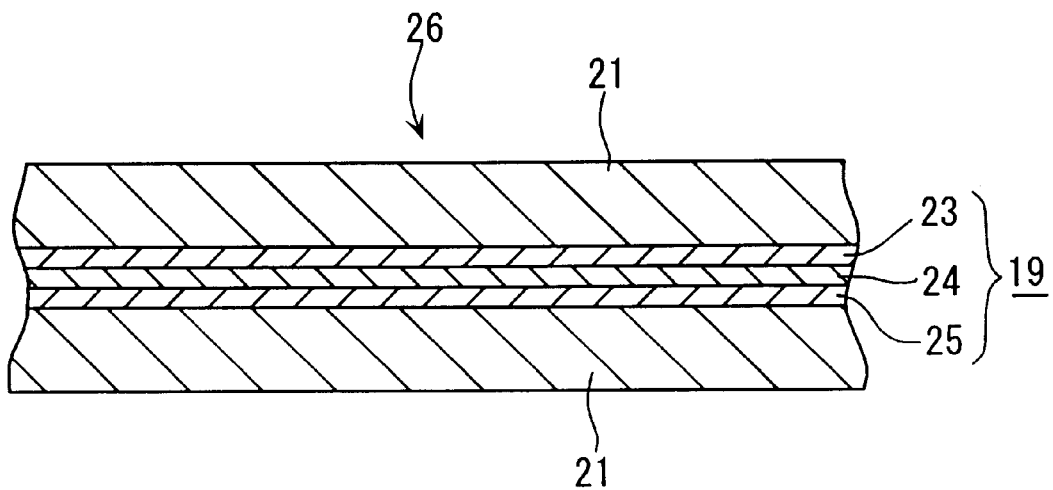
FIG. 2 is a cross-section showing structure of easily tearable laminated barrier film according to second embodiment of the present invention.

As shown in FIG. 2, the easily tearable laminated barrier film 26 according to the present embodiment includes easily tearable barrier film 19, a sealant film 21 laminated on one side of the easily tearable barrier film 19, and sealant film 21 laminated onto the other side of the easily tearable barrier film 19.

The easily tearable barrier film 19 and the sealant film 21 are the same as the first embodiment.

The bag product according to the present embodiment is made into a bag using the easily tearable laminated barrier film 26.

Provision of the sealant film 21 on both sides of the easily tearable barrier film 19 makes envelope seal possible, where the sealant film on one surface and the other surface are stuck together, as well as backlining seal, where the sealant film 21 on the same side is stuck.

Third Embodiment

Figure 3:
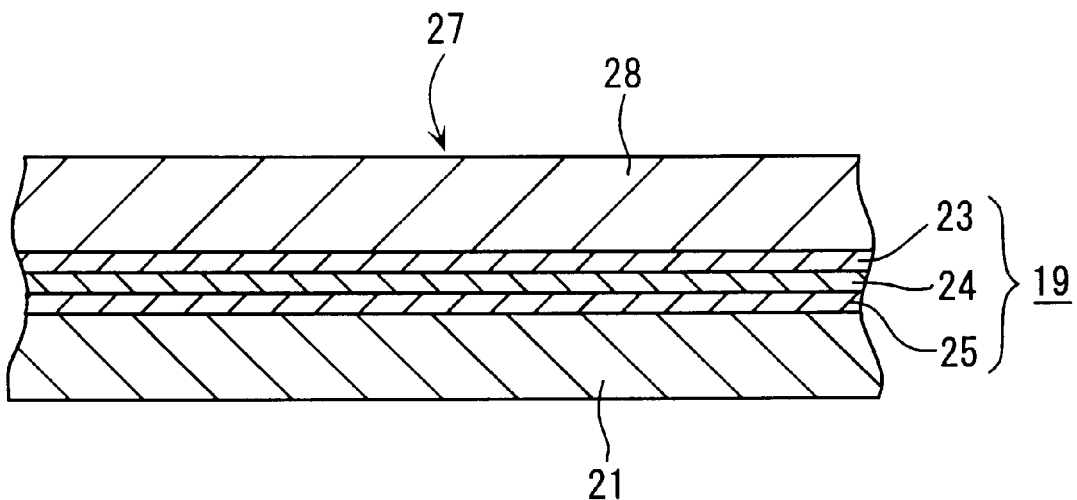
FIG. 3 is a cross-section showing structure of easily tearable laminated barrier film according to third embodiment of the present invention.

As shown in FIG. 3., easily tearable laminated barrier film 27 according to the present embodiment includes easily tearable barrier film 19, sealant film 21 laminated on one side of the easily tearable barrier film 19, and base film 28 laminated on the other side of the easily tearable barrier film 19.

The easy tearable barrier film 19 and the sealant film 21 are the same as in the first embodiment.

The base film 28 is made of PET, EVOH, PP, Ny etc.

The bag product according to the present embodiment is made into a bag using the easily tearable laminated barrier film 27.

Fourth Embodiment

Figure 4:
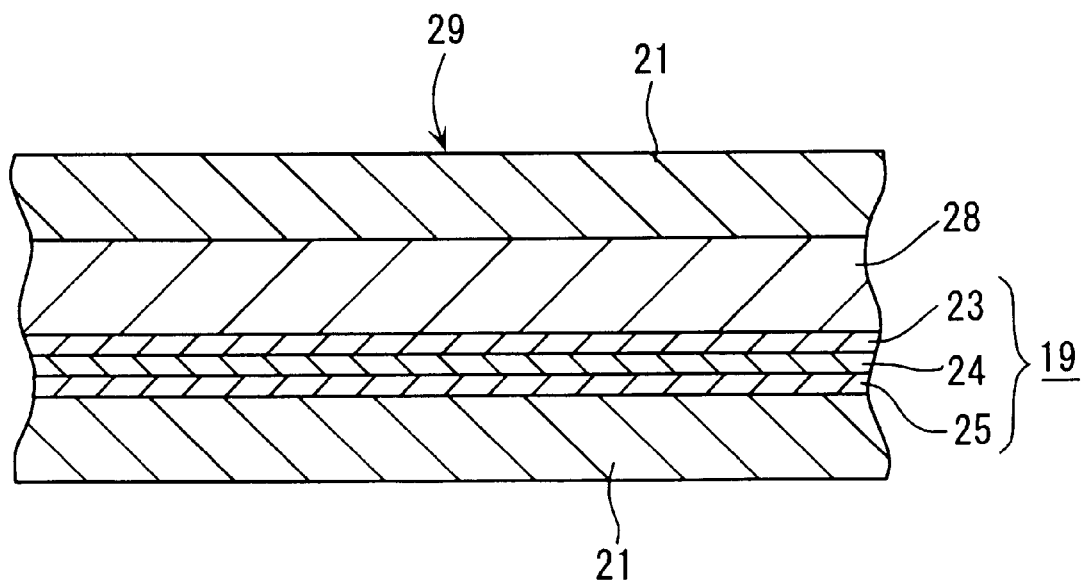
FIG. 4 is a cross-section showing structure of easily tearable laminated barrier film according to fourth embodiment of the present invention.

As shown in FIG. 4, easily tearable laminated barrier film 29 according to the present embodiment includes easily tearable barrier film 19, sealant film 21 laminated on one side of the easily tearable barrier film 19, base film 28 laminated on the other side of the easily tearable barrier film 19 and sealant film 21 laminated on the base film 28.

The easily tearable barrier film 19, the sealant film 21 and the base film 28 are the same as in the first and the third embodiment.

The bag product according to the present embodiment is made into bag using the easily tearable laminated barrier film 29.

Fifth Embodiment

Easily tearable laminated barrier film according to the present embodiment has the same structure as the easily tearable laminated barrier film 22, except that the second layer 24 of the easily tearable barrier film 19 includes only MXD6 and modifier and no Ny6.

EXAMPLE 1

The easily tearable laminated barrier film 22 of the present example was the easily tearable laminated barrier film of the first embodiment.

Initially, a mixture of Ny6 (70 wt %), MXD6 (25 wt %) and modified EVA (5 wt %) to be the first layer 23 and the third layer 25, and another mixture of Ny6 (20 wt %), MXD6(75 wt %), and modified EVA(5 wt %) to be the second layer 24 were respectively melted and kneaded in three extruders (diameter 40 mm) at 270° C., and subsequently, the molten material was extruded from a circular die having diameter of 90 mm as a cylindrical triple layered film, which was immediately cooled by water to make raw film. Layer ratio of the first to the third layers in the raw film was 1:1:1.

Nylon6 manufactured by UBE INDUSTRIES, LTD [UBE Nylon 1022 FD (trade name), relative viscosity η r=3.6] was used as Ny6, and metaxylylene adipamide [MX NYLON 6007 (trade name), relative viscosity η r=2.7] was used as MXD6.

Modified EVA was manufactured by UBE INDUSTRIES, LTD.

Figure 5:
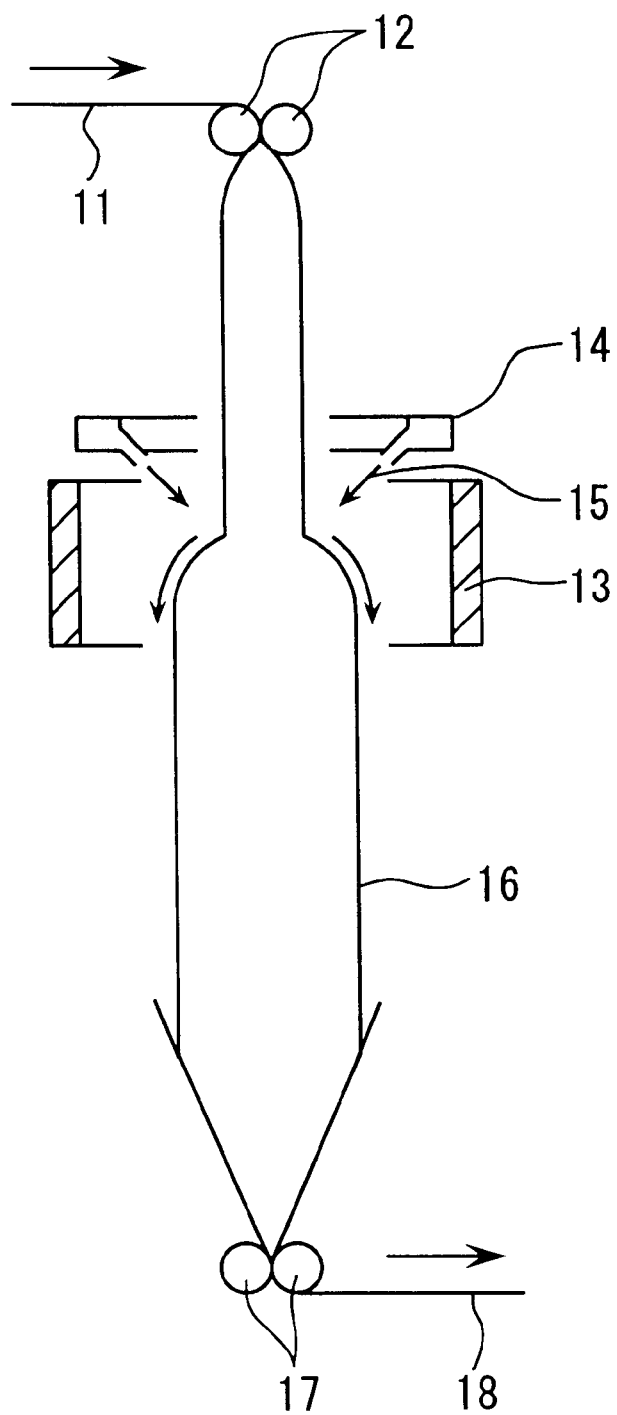
FIG. 5 is a schematic illustration of biaxial orientation equipment used in manufacturing method of easily tearable film according to an embodiment of the present invention.

Next, as shown in FIG. 5, after the raw film 11 was inserted in between a pair of nip roller 12, the raw film was heated by a heater 13 while injecting gas thereinto and was expanded into a bubble 16 by blowing air 15 from an air ring 14 to orientation initiation point, which was drawn by a downstream pair of nip roller 17 thus conducting biaxial orientation simultaneously in machine direction and transverse direction by tubular method to manufacture easily tearable film 18. The ratio of the orientation was 3.0 in both machine and transverse directions.

Next, the easily tearable film 18 was put into a tenter heat treat furnace to perform heat stabilization at 150° C. for ten minutes, thereby obtaining easily tearable barrier film 19. The easily tearable barrier film 19 had easily tearable property and was able to be cut linearly. The shrinkage factor of the easily tearable film 19 in pressurized hot water of 120° C. for twenty minutes was 28% in machine direction and 28% in transverse direction.

Next, as shown in FIG. 1, the sealant film 21 was dry-laminated on the easily tearable barrier film 19 (thickness 15 μm) to obtain easily tearable laminated barrier film 22 of the present embodiment. The sealant film 21 was non-oriented polypropylene film [UNILUX (trade name), manufactured by IDEMITSU PETROCHEMICAL, CO., LTD., Thickness 30 μm]. Shrinkage factor of the easily tearable laminated barrier film 22 in 120° C. of pressurized hot water for twenty minutes was 17% in machine direction and 17% in transverse direction. Gas barrier property of the laminate film was 7 cc/m2·24 hr at 23° C. and relative humidity (RH) of 60%.

The shrinkage factor in hot water was measured by painting 10 cm of index mark onto a sample along machine and transverse directions, retorting by hot water at 120° C. for twenty minutes and adjusting condition at 23° C., RH 50%. The shrinkage factor C was defined as C=(A−B)/A*100 (%), where A was initial length and B was length after shrinkage.

Next, the bag products of the present example were manufactured using the easily tearable laminated barrier film 22 by a bag making machine.

Figure 6:
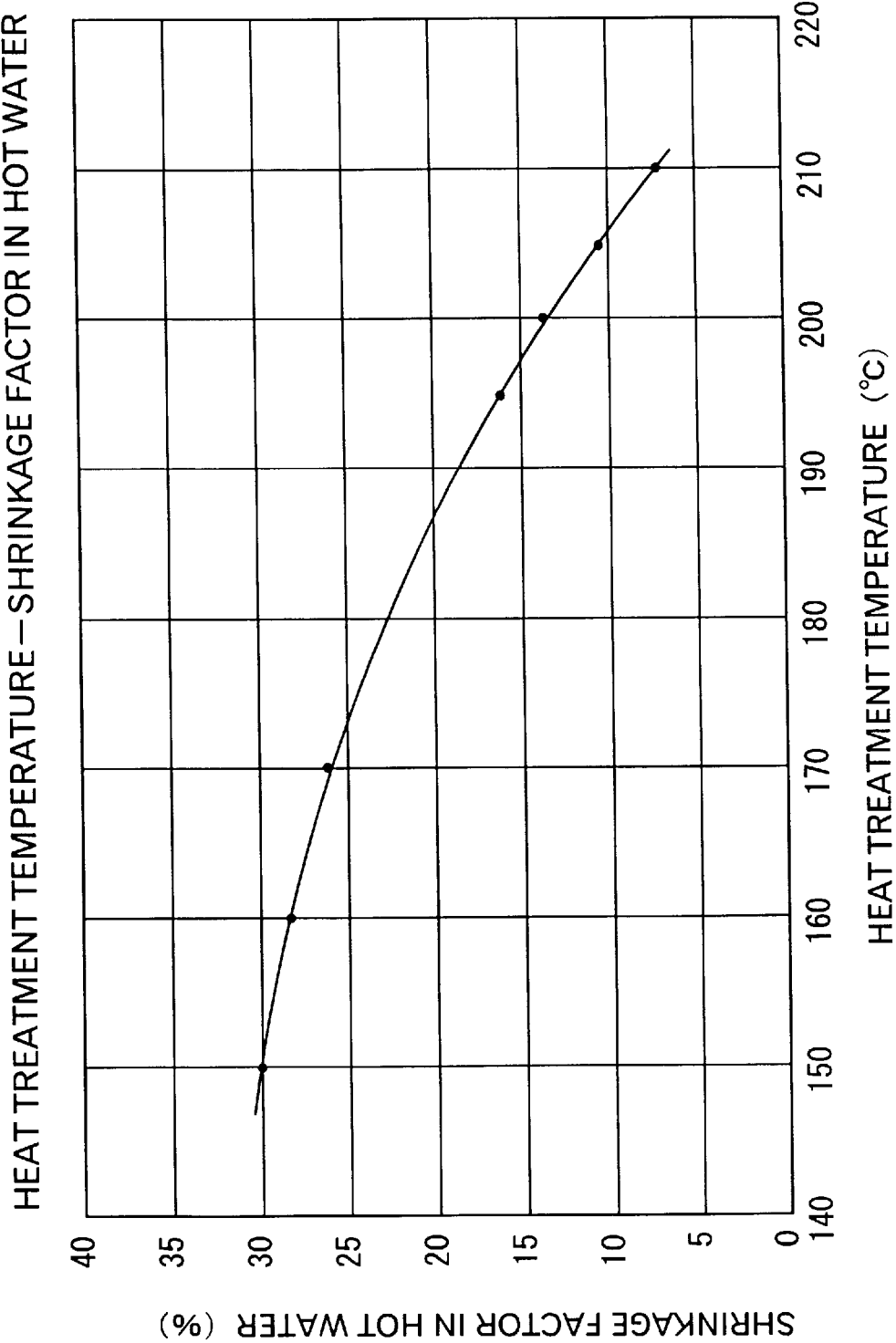
FIG. 6 is a graph showing a relationship between heat treatment temperature and shrinkage factor in pressurized 120° C. hot water for 20 minutes.

Incidentally, heat treatment temperature of the easily tearable barrier film 19 was 150° C. in the present example. FIG. 6 shows measurement result of the shrinkage factor in pressurized hot water of 120° C. for twenty minutes by changing the heat treatment temperature.

EXAMPLES 2 TO 11

Easily tearable laminated barrier film 26 according to the present examples is of the second embodiment.

As shown in FIG. 2, the easily tearable laminated barrier film 26 has sealant film 21 laminated on both sides of the easily tearable barrier film 19. Content of Ny6, MXD6 and modified EVA or PAE, layer ratio and heat treatment temperature is shown in Table 1.

Shrinkage factor of the easily tearable barrier film 19 and laminate film 26 in pressurized hot water of 120° C. for twenty minutes is shown in Table 1.

Polyamide elastomer [DIAMIDE PAE (trade name)] manufactured by DAICEL HÜLS LTD. was used as the PAE. The DIAMIDE PAE is a blockcopolymer having soft segment of polyether component and hard segment of nylon 12.

EXAMPLE 12

The easily tearable laminated barrier film 27 of the present example is of the third embodiment.

As shown in FIG. 3, the easily tearable laminated barrier film 27 has the sealant film 21 laminated on one side of the easily tearable barrier film 19 and the base film 28 laminated on the other side of the easily tearable barrier film 19. Content of Ny6, MXD6 and PAE, layer ratio and heat treatment temperature of the present example is shown in Table 1.

The base film 28 of the present example is oriented nylon6 film [UNILON (trade name), manufactured by IDEMITSU PETROCHEMICAL CO., LTD., Thickness 15 μm].

Shrinkage factors of the easily tearable barrier film 19 and laminate film 27 in pressurized hot water of 120° C. for twenty minutes are shown in Table 1.

EXAMPLE 13

The easily tearable laminated barrier film 29 of the present example is of the fourth embodiment.

As shown in FIG. 4, the easily tearable laminated barrier film 29 has the sealant film 21 laminated on one side of the easily tearable barrier film 19 and the base film 28 and the sealant film 21 laminated on the other side of the easily tearable barrier film 19. Content of Ny6, MXD6 and modified EVA or PAE, layer ratio and heat treatment temperature of the present example are shown in Table 1.

Specific examples of the base film 28 and the sealant film 21 are the same as the aforesaid examples.

Shrinkage factor of the easily tearable barrier film 19 and laminate film 29 in pressurized hot water of 120° C. twenty minutes is shown in Table 1.

EXAMPLE 14

The easily tearable laminated barrier film is of the fifth embodiment.

Comparisons 1 to 7

Comparison 1 relates to the first embodiment and comparisons 2 to 7 relate to the second embodiment, whose content of Ny6, MXD6 and modified EVA or PAE, layer ratio and heat treatment temperature are changed as shown in Table 3.

Shrinkage factor in pressurized hot water of 120° C. for twenty minutes of respective comparisons are shown in Table 3.

Evaluation of Properties

Anti-pinhole property, easy-tearability, gas barrier property and appearance were evaluated and overall evaluation was also conducted. The results are shown in Tables 2 and 4.

The anti-pinhole property was in compliance with Gelbo method of MIL B 131C standard performed in 23° C. for 3000 times, where not more than five through holes were evaluated as ○ and more than five through holes were evaluated as ×.

The easy-tearability was evaluated as ○ when shift amount from split initiation point to split termination point was not more than 15 mm within 100 mm span and evaluated as × when the shift amount exceeded 15 mm.

The gas barrier property was evaluated by measuring oxygen permeability in a condition of 23° C. and relative humidity of 60%, where ○ was marked when the oxygen permeability is not more than 15 cc/m2·24 Hr, and × was marked when the oxygen permeability exceeds 15 cc/m2·24 Hr.

The appearance was evaluated by preparing a casing three-side adhesion bag for ham and sausages; filling contents therein; conducting retorting process by hot water (120° C., for twenty minutes); and evaluating adhesion of the bag and contents. Good adhesion between the bag and the contents was evaluated as ○, and poor adhesion between the bag and the contents and warp were evaluated as ×.

In the overall evaluation column, ○ (accepted) was marked when all of the anti-pinhole property, easy-tearability, gas barrier property and appearance were ○, and × (rejected) was marked when there were at least one ×.

TABLE 1

| | Material Composition of Respective Layers (weight percent) | | | | | | | | Layer Ratio | | | Heat Treatment | Shrinkage Factor MD/TD (%) | |
|---|---|---|---|---|---|---|---|---|---|---|---|---|---|---|
| | 1st layer | | 2nd Layer | | 3rd Layer | | *1 | *2 | 1st | 2nd | 3rd | Temperature | Single | Laminated |
| | Ny6 | MXD6 | Ny6 | MXD6 | Ny6 | MXD6 | EVA | PAE | Layer | Layer | Layer | (° C.) | Film | Body |
| Example 1 | 70 | 25 | 20 | 75 | 70 | 25 | 5 | | 1 | 1 | 1 | 150 | 28/28 | 17/17 |
| Example 2 | 70 | 25 | 20 | 75 | 70 | 25 | 5 | | 2 | 1 | 2 | 160 | 27/27 | 17/17 |
| Example 3 | 70 | 25 | 20 | 75 | 70 | 25 | 5 | | 1 | 1 | 1 | 180 | 25/25 | 15/15 |
| Example 4 | 70 | 25 | 10 | 85 | 70 | 25 | 5 | | 1 | 1 | 1 | 150 | 22/22 | 13/13 |
| Example 5 | 70 | 25 | 25 | 70 | 70 | 25 | 5 | | 1 | 1 | 1 | 150 | 28/28 | 16/16 |
| Example 6 | 70 | 25 | 30 | 65 | 70 | 25 | 5 | | 1 | 1 | 1 | 150 | 29/29 | 16/16 |
| Example 7 | 70 | 28 | 24 | 74 | 70 | 28 | | 2 | 1 | 1 | 1 | 140 | 30/30 | 18/18 |
| Example 8 | 70 | 28 | 24 | 74 | 70 | 28 | | 2 | 2 | 1 | 2 | 160 | 27/27 | 17/17 |
| Example 9 | 70 | 28 | 24 | 74 | 70 | 28 | | 2 | 1 | 1 | 1 | 180 | 25/25 | 15/15 |
| Example 10 | 70 | 25 | 20 | 75 | 70 | 25 | 3 | 2 | 1 | 1 | 1 | 150 | 27/27 | 17/17 |
| Example 11 | 80 | 18 | 20 | 78 | 80 | 18 | | 2 | 1 | 1 | 1 | 150 | 27/27 | 17/17 |
| Example 12 | 70 | 25 | 20 | 75 | 70 | 25 | 5 | | 1 | 1 | 1 | 150 | 28/28 | 17/17 |
| Example 13 | 70 | 25 | 20 | 75 | 70 | 25 | 5 | | 1 | 1 | 1 | 150 | 28/28 | 17/17 |
| Example 14 | 70 | 25 | 0 | 95 | 70 | 25 | 5 | | 1 | 1 | 1 | 150 | 22/22 | 13/13 |

*1 EVA contained in respective layers.
*2 PAE contained in respective layers.
Components of respective layers are 100 wt % total.

TABLE 2

| | Composition and Thickness of Respective Layers (μm) | | | | | | | |
|---|---|---|---|---|---|---|---|---|
| | CPP Film | Easily tearable barrier film | CPP Film | Anti-Pinhole Property | Easy Tearability | Gas Barrier Property | Appearance | Overall Evaluation |
| Example 1 | 30 | 15 | | ○ | ○ | ○ | ○ | ○ |
| Example 2 | 15 | 15 | 15 | ○ | ○ | ○ | ○ | ○ |

TABLE 2-continued

| | Composition and Thickness of Respective Layers (μm) | | | | | | | |
|---|---|---|---|---|---|---|---|---|
| | CPP Film | Easily tearable barrier film | CPP Film | Anti-Pinhole Property | Easy Tearability | Gas Barrier Property | Appearance | Overall Evaluation |
| Example 3 | 15 | 15 | 15 | ○ | ○ | ○ | ○ | ○ |
| Example 4 | 15 | 15 | 15 | ○ | ○ | ○ | ○ | ○ |
| Example 5 | 15 | 15 | 15 | ○ | ○ | ○ | ○ | ○ |
| Example 6 | 15 | 15 | 15 | ○ | ○ | ○ | ○ | ○ |
| Example 7 | 15 | 15 | 15 | ○ | ○ | ○ | ○ | ○ |
| Example 8 | 15 | 15 | 15 | ○ | ○ | ○ | ○ | ○ |
| Example 9 | 15 | 15 | 15 | ○ | ○ | ○ | ○ | ○ |
| Example 10 | 15 | 15 | 15 | ○ | ○ | ○ | ○ | ○ |
| Example 11 | 15 | 15 | 15 | ○ | ○ | ○ | ○ | ○ |
| Example 12 | 15 | 15 | *A15 | ○ | ○ | ○ | ○ | ○ |
| Example 13 | | *B 15/15/15/15 | | ○ | ○ | ○ | ○ | ○ |
| Example 14 | 15 | 15 | 15 | ○ | ○ | ○ | ○ | ○ |

*A . . . Oriented Nylon.

TABLE 3

| | Material Composition of Respective Layers (weight percent) | | | | | | | | Layer Ratio | | | Heat Treatment | Shrinkage Factor MD/TD (%) | |
|---|---|---|---|---|---|---|---|---|---|---|---|---|---|---|
| | 1st layer | | 2nd Layer | | 3rd Layer | | *1 | *2 | 1st | 2nd | 3rd | Temperature | Single | Laminated |
| | Ny6 | MXD6 | Ny6 | MXD6 | Ny6 | MXD6 | EVA | PAE | Layer | Layer | Layer | (° C.) | Film | Body |
| Comparison 1 | 70 | 25 | 20 | 75 | 70 | 25 | 5 | | 1 | 1 | 1 | 210 | 6/6 | 3/3 |
| Comparison 2 | 72 | 25 | 10 | 87 | 72 | 25 | 3 | | 1 | 1 | 1 | 210 | 6/6 | 3/3 |
| Comparison 3 | 87 | 10 | 0 | 97 | 87 | 10 | | 3 | 1 | 1 | 1 | 160 | 26/26 | 16/16 |
| Comparison 4 | 70 | 30 | 100 | 0 | 70 | 30 | | | 1 | 1 | 1 | 160 | 26/26 | 16/16 |
| Comparison 5 | 85 | 10 | | | | | 5 | | 1 | 0 | 0 | 160 | 28/28 | 17/17 |
| Comparison 6 | 100 | 0 | 0 | 100 | 100 | 0 | | | 1 | 1 | 1 | 210 | 6/6 | 3/3 |
| Comparison 7 | 59 | 30 | 0 | 89 | 59 | 30 | | 11 | 1 | 1 | 1 | 160 | 26/26 | 16/16 |

*1 EVA contained in respective layers.
*2 PAE contained in respective layers.
Components of respective layers are 100 wt % total.

TABLE 4

| | Composition and Thickness of Respective Layers (μm) | | | | | | | |
|---|---|---|---|---|---|---|---|---|
| | CPP Film | Easily tearable barrier film | CPP Film | Anti-Pinhole Property | Easy Tearability | Gas Barrier Property | Appearance | Overall Evaluation |
| Comparison 1 | 15 | 15 | 15 | ○ | ○ | ○ | × | × |
| Comparison 2 | 30 | 15 | | ○ | ○ | ○ | × | × |
| Comparison 3 | 15 | 15 | 15 | ○ | × | ○ | ○ | × |
| Comparison 4 | 15 | 15 | 15 | × | × | × | ○ | × |
| Comparison 5 | 15 | 15 | 15 | ○ | × | × | ○ | × |
| Comparison 6 | 15 | 15 | 15 | × | × | ○ | × | × |
| Comparison 7 | 15 | 15 | 15 | ○ | ○ | ○ | × | × |

From Table 2, it can be understood that the bag products made of the easily tearable laminated barrier films 22, 24, 27 and 29 according to Examples 1 to 11 had good anti-pinhole property and easy-tearability because of the easily tearable barrier film 19 and the sealant film 21 of the present invention.

And the bag products of respective examples had good gas barrier property since the easily tearable film 18 contained a predetermined amount of Ny6 and MXD6.

Further, since the bag had great shrink properties, good adhesion between the laminate films 22, 24, 27 and 29 and the contents could be obtained, resulting in good appearance of the bag products.

On the other hand, in view of Table 2, though content of Ny6 and MXD6 of respective layers of the easily tearable film was within the range of the present invention, the bag products made of laminate film of comparisons 1 and 2 had poor appearance since heat treatment temperature was out of the range of the present invention and shrinkage factor in hot water was less than 15%.

The bag product of comparison 3 had poor easy-tearability, since content of MXD6 of the first and the third layer was less than 15%.

Since the bag product according to comparison 14 had no MXD6 in the second layer of the easily tearable film, easy-tearability and gas barrier property were poor.

Since the bag product according to comparison 5 had no second layer and third layer of the present invention in the easily tearable film thereof, easy-tearability and gas barrier properties were poor.

Since the bag product according to comparison 6 had no MXD6 in the first and the third layer of the easily tearable film, easy-tearability was poor. Further, since the heat treatment temperature exceeds the range of the present invention and shrinkage factor in hot water was less than 15%, appearance thereof was poor.

The bag product according to comparison 7 had excessive addition of modifier PAE, which resulted in bad transparency and poor appearance.

INDUSTRIAL AVAILABILITY

As described above, the easily tearable laminated barrier film and bag product are harmless to the environment and have appropriate shrink property as well as easy-tearability, thus being suitable for wrapping bags of, for instance, food, medicine and industrial products.

What is claimed is:

1. A tearable laminated barrier film comprising:
    a tearable barrier film having first, second and third layers, an orientation ratio of not less than 2.8 in both machine and transverse directions during orientation and a shrinkage factor of 15 to 40% in pressurized water at a temperature of 120° C. for twenty minutes by heat stabilization at a heat treatment temperature of from 120 to 195° C.; and
    at least one base film laminated on the tearable barrier film,
    wherein each of the first and third layers of the tearable barrier film consists of 60 to 85 wt. % of nylon 6, 15 to 40 wt. % of metaxylylene adipamide and 0.1 to 10 wt. % of a modifier and the second layer of the tearable barrier film consists of 0 to 40 wt. % of thermoplastic resin, 60 to 95 wt. % of metaxylylene adipamide and 0.1 to 10 wt. % of the modifier, the modifier being at least one member selected from the group consisting of a polyamide elastomer and a modified ethylene-vinyl acetate copolymer, the modified ethylene-vinyl acetate copolymer being an acid-denatured body of a partial saponification of an ethylene-vinyl acetate copolymer having 20 to 50 wt. % of vinyl acetate.

2. The tearable laminated barrier film according to claim 1, wherein the thermoplastic resin of the second layer contains 5 to 40 wt. % of nylon6.

3. The tearable laminated barrier film according to claim 1, wherein a layer ratio between the first or the third layer and the second layer is from 1:8 to 2:1.

4. The tearable laminated barrier film according to claim 3, wherein the layer ratio of the first, the second, and the third layer is from 1:8:1 to 4:2:4.

5. The tearable laminated barrier film according to claim 1, wherein the base film is a sealant film.

6. A bag product manufactured with the tearable laminated barrier film according to claim 1.

* * * * *